July 29, 1969 G. J. MICHON ET AL 3,458,731
PRECISION TIMING PULSE GENERATOR
Filed Oct. 24, 1966

INVENTORS
GERALD J. MICHON
JERRY L. STRATTON
BY
THEIR ATTORNEY

United States Patent Office 3,458,731

Patented July 29, 1969

3,458,731

PRECISION TIMING PULSE GENERATOR

Gerald J. Michon, Waterford, and Jerry L. Stratton, Schenectady, N.Y., assignors to General Electric Company, a corporation of New York Filed Oct. 24, 1966, Ser. No. 588,980
Int. Cl. H03k 1/14
U.S. Cl. 307—265 9 Claims

ABSTRACT OF THE DISCLOSURE

A precision pulse generator wherein a resonant circuit is damped by a shunt circuit and energy is stored therein during quiescent operation. Upon application of an input signal a pulse is generated having a time duration nominally related to but less than a preselected integral number of cycles of the resonant frequency of the resonant circuit. The pulse and the output of the resonant circuit are coupled to the inputs of a comparison circuit. The comparison circuit provides an output, commencing with initiation of the pulse, to disable the damping and energy storage circuit of the resonant circuit, and the resonant circuit produces oscillations which terminate upon the completion of an integral number of cycles immediately subsequent to the termination of the aforesaid pulse.

Figures 1, 2:
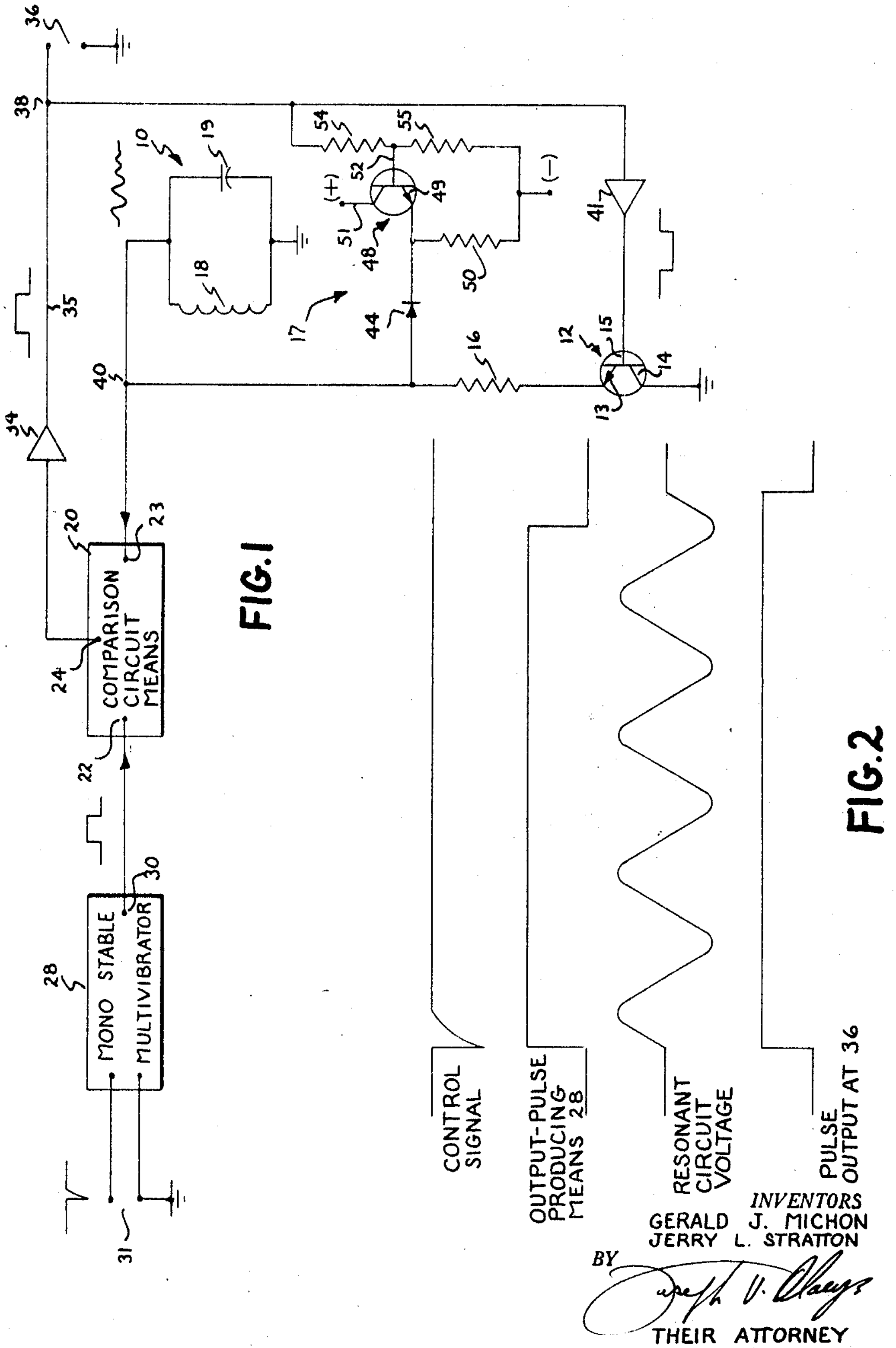

This invention relates to timing pulse generators and more particularly to an electronic timing pulse generator which produces a pulse of precisely predetermined time duration in response to an applied control signal.

It is an object of this invention to provide an electronic precision time duration pulse generator wherein the time duration of the pulse produced in response to an applied control signal is not affected by variations in temperature, supply voltage or control signal.

It is another object of this invention to provide an electronic timing pulse generator wherein the means for determining the time duration of the pulse is, or can be readily and inexpensively provided to be, inherently insensitive to temperature variations.

Briefly stated, in accordance with one aspect of this invention, a precision time duration timing pulse generator is provided employing a resonant circuit means for determining the time duration of the pulse. The resonant circuit means is arranged in circuit with a source of potential and has first and second operating conditions. In the first or "stand-by" operating condition the resonant circuit means is heavily damped and with energy stored therein and in the second operating condition the resonant circuit is more lightly damped and produces oscillations at the resonant frequency. The precision timing pulse generator also includes a pulse producing means which, in response to a suitable control signal applied thereto, produces a pulse having a voltage greater than the maximum voltage of the oscillations of the resonant circuit means and a time duration nominially related to, but less than, a preselected integral number of cycles of the resonant frequency. A comparison circuit means is provided which senses the output of the pulse producing means and the resonant circuit means and produces an output only when the output of the pulse producing means exceeds that of the resonant circuit means. The output of the comparison circuit means is operative to cause the operating condition of the resonant circuit means to be changed so that the output of the comparison circuit means has a time duration exactly equal to the preselected integral number of cycles of the resonant frequency. Since the frequency of the resonant circuit means can readily be provided extremely stable and insensitive to temperature and it not dependent upon the magnitude of either the control signal or the supply voltage, the pulse produced has a very precisely predetermined time duration.

The novel features believed characteristic of the invention are set forth with particularity in the appended claims. The invention itself, however, both as to its organization and method of operation as well as further objects and advantages thereof may best be understood by reference to the following description taken in connection with the following drawing in which:

FIG. 1 is a schematic circuit diagram partly in block form illustrating a precision time duration timing pulse generator in accordance with one embodiment of this invention; and FIG. 2 is a timing diagram showing waveforms at various portions of the timing pulse generator of FIG. 1.

Referring now to FIG. 1, a precision pulse generator includes a resonant circuit means 10, having a stable resonant frequency, arranged in circuit with a switch means 12. Switch means 12 is illustrated as a semiconductor transistor device having an emitter electrode 13, a collector electrode 14 and a base electrode 15 and is arranged to be in a normally closed condition to connect a damping resistance 16 across the resonant circuit means 10. To assure that the resonant circuit means has energy stored therein, a charging means, generally designated at 17, is provided. The resonant circuit means is arranged to be operated, therefore, in a highly damped condition with energy stored therein when the switch means is in its closed condition and in a lightly damped or "ringing" mode when the switch means is changed from its closed to its open condition so that it produces damped oscillations at the resonant frequency.

In FIG. 1 the resonant circuit means 10 is illustarted as the parallel combination of an inductance 18 and a capacitance 19, however it is to be understood, as will become more apparent hereinafter, that any suitable resonant circuit means may be employed, such as for example a tuning fork, resonant reed or the like.

An important feature of this invention is the arrangement whereby all of the energy used in the resonant circuit means is stored in one of its elements during its first, or stand-by, operating condition with the resonant circuit means being allowed to oscillate during the timing period. The oscillations are then stopped at precisely the point of the cycle where the resonant circuit energy is all stored in the same element as during the stand-by condition. For the arrangement illustrated, the energy is stored as current in the inductance 18 and the timing cycle is terminated when the current in the inductance is a maximum, with zero voltage across the capacitance 19, that is, zero energy in the capacitive element.

Similarly, a tuning fork may be suitably arranged so that at the stand-by condition the fork is deflected to one of its maximum excursions; the timing period being initiated by releasing the external deflecting force thereby allowing the fork to vibrate. The use of any suitable sensing means allows the initial deflecting force to be reapplied at precisely the phase of the operating cycle where the deflection of the fork is maximum (the same position as in the stand-by condition).

The precision pulse generator also includes a comparison circuit means 20, which may be a differential amplifier for example, having a first input means 22, a second input means 23 and an output means 24. Comparison circuit means 20 is adapted to produce an output only when the voltage of the signal at its first input means exceeds that of the signal at its second input means.

A pulse producing means 28 is provided which produces a pulse at its output means 30 in response to a suitable control signal applied to its input means 31. Pulse producing means 28 is arranged and adapted to produce an output pulse having a voltage greater than the maximum voltage of the oscillations produced by the resonant circuit means and of a time duration nominally related to, but less than, a preselected integral number of cycles of the resonant frequency. For example, if the preselected number of cycles is four (4) then the time duration of the pulse produced by pulse producing means 28 may be conveniently provided to be equal to the time of about three and three-fourths (3¾) of such cycles.

As shown, the output of pulse producing means 28 is applied to the first input means 22 of comparison circuit means 20 with the output of resonant circuit means 10 being applied to the second input means 23 thereof. Accordingly, comparison circuit means 20 produces an output at output means 24 as long as the voltage of pulse producing means 28 exceeds that of resonant circuit means 10.

The output of comparison circuit means 20 is suitably amplified by amplifier means 34 and applied over conductor 35 to output means 36 of the precision pulse generator. This amplified output is also fed from junction 38 to charging means 17 and to the switch means 12 operative to disable charging means 17 and to cause the switch means to change from its normally closed condition to its open condition and to remain in such open condition as long as an output is produced by comparison circuit means 20.

In the particular arrangement illustrated, switch means 12 is a semiconductor transistor device arranged with its emitter electrode 13 connected through damping resistance 16 to the junction 40 between resonant circuit means 10 and second input means 23 of comparison circuit means 20, its collector electrode 14 connected to a point of common reference potential, such as ground, and its base electrode 15 connected through an inverter means 41 to the junction 38.

Charging means 17 is also arranged to be changed from a charging to a non-charging condition when an output is present from comparison circuit means 20. This is accomplished by the provision of a diode device 44 connected between the resonant circuit means and a suitable source of potential with the diode device arranged to be forwardly biased to allow for charging of the resonant circuit means 10 when no output is present from comparison circuit means 20 and to be reverse biased to prevent current flow therethrough when an output is present from comparison circuit means 20.

In the arrangement illustrated in FIG. 1 this is conveniently accomplished by connecting a transistor device 48 between the diode device 44 and the amplified output of comparison circuit means 20. Thus, transistor device 48 has its emitter electrode 49 connected through a suitable resistance 50 to one side of the potential source, its collector electrode 51 connected to the other side thereof and its base electrode 52 connected through a voltage divider, including resistances 54 and 55, to the amplified output of comparison circuit means 20 at the junction 38.

The operation of the precision timing pulse generator may best be explained by reference ot the timing diagram of FIG. 2. Although for simplicity this timing diagram is based upon a pulse duration from the precision pulse generator equal to the time of four (4) cycles of the resonant circuit means 10, it will be understood that any integral number of ringing cycles may be selected within the damping limitations of the resonant circuit means.

In operation, assume initially that the timing pulse generator is in a stand-by condition. In this stand-by condition resonant circuit means 10 is in its first or normal operating condition, heavily damped and with energy stored therein. To this end, switch means 12 is in its "closed" or conducting condition to effectively connect resistance 16 across resonant circuit means 10 causing it to be heavily damped. Also, transistor device 48 is in its "open" or nonconducting condition so that diode device 44 is forward biased allowing current to flow through inductance 18 of resonant circuit means 10.

Upon receipt of a control pulse, shown as a trigger pulse, at the input means 31, a pulse is generated by pulse producing means 28 which has a time duration, as shown in FIG. 2, of greater than three and one-half (3½) cycles and less than four (4) cycles of the resonant frequency of resonant circuit means 10. Also, the voltage of the pulse produced by pulse producing means 28 is arranged to be greater than the maximum voltage of the lightly damped oscillations produced by the resonant circuit means 10 when in its second operating condition.

Thus, upon receipt of the control pulse by pulse producing means 28, the comparison circuit means 20 senses that the voltage at its first input means 22 is greater than that at its second input means 23 and accordingly an output is initiated by circuit means 20. This output is amplified by amplifier means 34 and fed from junction 38 through voltage divider resistance 54 to the base electrode 52 of transistor device 48 and also, through inverter means 41, to the base electrode 15 of transistor device 12.

The presence of the amplified output of circuit means 20 at the base electrode 52 causes transistor device 48 to turn "on" to thereby reverse bias diode device 44 and block the charging path to the resonant circuit means 10. At the same time the inverted output at the base electrode 15 causes transistor device 12 to turn "off" thereby removing th effect of damping resistance 16 on resonant circuit means 10 so that the resonant circuit means begins to produce lightly damped oscillations at the resonant frequency.

The damped oscillations continue until comparison circuit means 20 senses that the voltage of the oscillations of resonant circuit means 10 at its second means 23 is greater than the voltage at its first input means 22. As illustrated by the timing diagram of FIG. 2, the output voltage of pulse producing means 28 is larger than the maximum voltage of the "ringing" resonant circuit means 10 for between about three and one half (3½) and four (4) cycles of ringing. Accordingly, the output appearing at the output means 36 persists until the end of the fourth cycle of ringing.

For example, at the end of the fourth cycle of ringing when the ringing voltage passes through zero in the positive direction, comparison circuit means 20 senses that the voltage at its second input means 23 exceeds that at its first input means 22 and the output pulse from circuit means 20 terminates since, as previously described, circuit means 20 is adapted to produce an output only when the voltage at its first input means 22 exceeds that at its second input means 23.

Termination of the output pulse from circuit means 20 causes transistor device 48 to turn "off" and transistor device 12 to turn "on" thereby causing the reapplication of charging energy and heavy damping to the resonant circuit means 10. Since some energy is dissipated during the "ringing" of the resonant circuit means 10, a finite time is required for such resonant circuit means to return to its original level of energy storage after which time the arrangement is ready to generate another precision time duration pulse in response to an applied control signal.

From the foregoing description it will be apparent that the time duration of the pulse appearing at output means 36 is uniquely dependent upon the resonant frequency of the resonant circuit means 10. Also, because of the great rate of change of the ringing sine wave signal at the second input means of comparison circuit means 20, much higher accuracy can be achieved than would be possible with an inductance-resistance or resistance-capacitance timing circuit with the same stability. Further, pulse width control can be readily changed without loss of accuracy by changing the time duration of the pulse from the pulse producing means 28 to allow for the selection of a different integral number of cycles of the resonant frequency.

While a specific embodiment of the invention has been shown and described, it will, of course, be understood that various changes and modifications may be made without departing from the principles of the invention. The appended claims are therefore intended to cover all changes and modifications as come within the true spirit and scope of the invention.

What we claim as new and desire to secure by Letters Patent of the United States is:

1. In an arrangement for producing a pulse of precisely predetermined time duration in response to an applied input signal, the combination comprising:
(a) resonant circuit means exhibiting a stable predetermined resonant frequency;
(b) pulse producing means responsive to an applied input signal for producing a pulse of a time duration nominally related to but less than a preselected integral number of cycles of said resonant frequency;
(c) comparison circuit means having a first input means coupled to the output of said pulse producing means and a second input means coupled to said resonant circuit means, said comparison circuit means being adapted to produce an output only when the voltage of the signal at said first input means exceeds that of the signal at said second input means; and
(d) means responsive to the presence of an output from said comparison circuit means for changing said resonant circuit means from a heavily damped condition with energy stored therein to a more lightly damped condition producing lightly damped oscillations at said resonant frequency having a maximum magnitude less than the magnitude of the output of said pulse producing means.

2. The combination of claim 1 wherein said means for changing the operating condition of said resonant circuit means is a switch means.

3. The combination of claim 2 wherein said switch means is a semiconductor switching device having an emitter electrode, a collector electrode and a base electrode and arranged to be normally conductive in the absence of a signal to said base electrode from the output of said comparison circuit means.

4. The combination of claim 1 wherein said pulse producing means is a monostable multivibrator.

5. In an arrangement for producing a pulse of precisely predetermined time duration in response to an applied control signal, the combination comprising:
(a) resonant circuit means exhibiting a stable predetermined resonant frequency;
(b) switch means arranged in circuit with said resonant circuit means, said switch means being operable between a normal first condition so that said resonant circuit means has energy stored therein and is in a heavily damped condition and a second condition wherein said resonant circuit means is in a more lightly damped condition to cause said reasonant circuit means to produce lightly damped oscillations at said resonant frequency;
(c) pulse producing means responsive to an applied control signal for producing a pulse having a voltage greater than the maximum voltage of the oscillations produced by said resonant circuit means and a time duration nominally related to but less than a preselected integral number of cycles of said resonant frequency;
(d) comparison circuit means having first and second input means and an output means and being adapted to produce an output only when the voltage of the signal applied at said first input means exceeds that of the signal applied at said second input means;
(e) means applying the output of said pulse producing means to said first input means and the output of said resonant circuit means to said second input means so that said comparison circuit means produces an output only when the voltage of the output from said pulse producing means exceeds the voltage of the oscillations of said resonant circuit means; and
(f) means coupling the output of said comparison circuit means to said switch means for changing the operating condition thereof whereby the output of said comparison circuit means has a time duration exactly equal to the preselected integral number of cycles of said resonant frequency.

6. The arrangement of claim 5 wherein the time duration of the pulse produced by said pulse producing means is equal to about one half cycle less than the preselected number of cycles of said resonant frequency.

7. The arrangement of claim 5 wherein said switch means is a semiconductor device and said pulse producing means is a monostable multivibrator whose operation is initiated by the control signal applied thereto.

8. The arrangement of claim 7 wherein said resonant circuit means is a parallel inductance-capacitance combination.

9. A precision timing pulse generator for producing a pulse of precisely predetermined time duration comprising:
(a) resonant circuit means exhibiting a stable resonant frequency;
(b) means for producing a pulse having a voltage greater than the maximum voltage of oscillations produced by said resonant circuit means and a time duration nominally related to but less than a preselected integral number of cycles of the resonant frequency;
(c) comparison circuit means having first and second input means and an output means, said comparison circuit means being adapted to produce an output only when the voltage of the signal applied at its first input means exceeds the voltage of the signal applied at its second input means;
(d) means coupling the output of said reasonant circuit means to said second input means, means coupling said pulse to said first input means;
(e) charging circuit means including a diode device, said diode device being arranged between said resonant circuit means and a source of potential and operative when forwardly-biased to allow current flow to said resonant circuit means and when reverse-biased to block such current flow so that said resonant circuit means has energy stored therein;
(f) switch means in circuit with said resonant circuit means, said switch means having a normal first operating condition effective to cause said resonant circuit means to be highly damped and a second operating condition effective to cause said resonant circuits means to be less highly damped so that said resonant circuit means produces oscillations at said resonant frequency; and
(g) means coupling the output of said comparison circuit means to both said charging circuit means and said switch means operative when present to:
  (a) change said diode device from its forward to its reverse biased condition, and
  (b) change said switch means from its first to its second operating condition.

References Cited

UNITED STATES PATENTS

| | | | |
|---|---|---|---|
| 2,741,701 | 4/1956 | Harris | 331—166 |
| 3,182,265 | 5/1965 | Wu | 328—113 XR |

ARTHUR GAUSS, Primary Examiner

J. ZAZWORSKY, Assistant Examiner

U.S. Cl. X.R.

328—58, 113, 223; 331—166